(12) United States Patent
Reimchen et al.

(10) Patent No.: US 11,060,568 B2
(45) Date of Patent: Jul. 13, 2021

(54) RETURN STOP

(71) Applicant: Schaeffler Technologies AG & Co. KG, Herzogenaurach (DE)

(72) Inventors: Alexander Reimchen, Herzogenaurach (DE); Frieder Altmann, Pommersfelden (DE); Stefan Hofmann, Großenseebach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/633,069

(22) PCT Filed: Jul. 12, 2018

(86) PCT No.: PCT/DE2018/100640
§ 371 (c)(1),
(2) Date: Jan. 22, 2020

(87) PCT Pub. No.: WO2019/024957
PCT Pub. Date: Feb. 7, 2019

(65) Prior Publication Data
US 2020/0173501 A1    Jun. 4, 2020

(30) Foreign Application Priority Data
Jul. 31, 2017    (DE) .................... 10 2017 117 234.3

(51) Int. Cl.
*F16D 41/067*    (2006.01)
*F16D 41/06*    (2006.01)

(52) U.S. Cl.
CPC .... *F16D 41/067* (2013.01); *F16D 2041/0605* (2013.01)

(58) Field of Classification Search
CPC ........ F16D 41/20; F16D 41/067; F16D 41/08; F16D 2041/0605
See application file for complete search history.

(56) References Cited

U.S. PATENT DOCUMENTS

| 1,512,675 | A | 10/1924 | Chryst |
|---|---|---|---|
| 2,076,828 | A | 4/1937 | Swartz |

(Continued)

FOREIGN PATENT DOCUMENTS

| CN | 1206078 A | 1/1999 |
|---|---|---|
| CN | 2356181 Y | 12/1999 |

(Continued)

*Primary Examiner* — Huan Le
(74) *Attorney, Agent, or Firm* — Reid A. Baldwin

(57) ABSTRACT

A return stop includes a rotational inner ring, a stationary, fixed outer ring, and a cage mounted radially between the inner ring and outer ring. The cage has at least two pairs of rollers each having a first and a second roller. A clamping rail is formed on an outer peripheral surface of the inner ring for each roller. A radial recess is formed on the inner ring in the peripheral direction directly adjacent to the respective clamping rail. Also, both of the clamping rails of the roller pairs are formed in the peripheral direction in opposite directions away from each other. In a free-running operation of the return stop, only one roller of each pair of rollers comes into position on the inner ring and the outer ring. The other roller of each pair of rollers does not come into position at least one the inner ring.

20 Claims, 2 Drawing Sheets

(56) References Cited

U.S. PATENT DOCUMENTS

| | | | | |
|---|---|---|---|---|
| 2,209,122 A | * | 7/1940 | Houplain | B62D 3/02 |
| | | | | 192/223.2 |
| 4,815,577 A | * | 3/1989 | Lederman | F16D 41/067 |
| | | | | 192/45.008 |
| 2017/0138415 A1 | * | 5/2017 | Kitayama | F16D 27/06 |
| 2017/0327143 A1 | * | 11/2017 | Aramoto | F16D 15/00 |

FOREIGN PATENT DOCUMENTS

| | | |
|---|---|---|
| CN | 101317022 A | 12/2008 |
| CN | 105402275 A | 3/2016 |
| CN | 105822690 A | 8/2016 |
| DE | 102010052922 A1 | 5/2012 |
| DE | 102015201403 A1 | 7/2016 |
| WO | 2017051817 A1 | 3/2017 |
| WO | 2017104385 A1 | 6/2017 |

\* cited by examiner

US 11,060,568 B2

RETURN STOP

CROSS-REFERENCE TO RELATED APPLICATIONS

This application is the U.S. National Phase of PCT Appln. No. PCT/DE2018/100640 filed Jul. 12, 2018, which claims priority to DE 10 2017 117 234.3 filed Jul. 31, 2017, the entire disclosures of which are incorporated by reference herein.

TECHNICAL FIELD

The disclosure relates to a return stop comprising a rotational inner ring and a stationary, fixed outer ring in addition to a cage which is mounted radially between the inner ring and the outer ring, the cage having several pairs of rollers.

BACKGROUND

The DE 10 2015 201 403 A1 discloses a return stop comprising a rotational inner ring and a stationary, fixed outer ring in addition to a cage which is mounted radially between the inner ring and the outer ring, the cage having several pairs of rollers, each consisting of two rollers. Between the two rollers of the respective pair of rollers, at least one spring element is mounted to spring-load the rollers at least against the outer ring. A clamping ramp is formed on an outer peripheral surface of the inner ring for each roller of the respective pair of rollers. Mounted on the outer peripheral surface of the inner ring is, at least one radially outwardly formed cam which engages in a groove formed on the cage, wherein the at least one cam is formed smaller than the groove in the peripheral direction. As a result of a movement of the cage relative to the inner ring, the respective roller of the respective pair of rollers comes to bear both against the respective clamping ramp and against the outer ring. A radial depression is formed on the inner ring directly adjacent to a respective clamping ramp, wherein respectively only one roller of the respective pair of rollers comes to bear at the same time against the inner ring and against the outer ring and the respective other roller of the respective pair of rollers, owing to the respective radial depression, does not come to bear at least against the inner ring.

SUMMARY

A return stop comprises a rotational inner ring and a stationary, fixed outer ring in addition to a cage which is mounted radially between the inner ring and the outer ring, the cage having at least two pairs of rollers respectively consisting of a first and a second roller, wherein a clamping ramp is formed on an outer peripheral surface of the inner ring for each roller of the respective pair of rollers, wherein a radial depression is formed on the inner ring in the peripheral direction directly adjacent to the respective clamping ramp, wherein also, both of the respective clamping ramps of the respective pair of rollers are formed so as to lead in the peripheral direction in opposite directions away from each other, and wherein, in a free-running operation of the return stop, respectively only one roller of the respective pair of rollers comes to bear at the same time against the inner ring and against the outer ring and the respective other roller of the respective pair of rollers, owing to the respective radial depression, does not come to bear at least against the inner ring, wherein a respective spring element designed as a wire bending spring is mounted on the inner ring to spring-load both rollers at least against the outer ring.

The activation of a blocking operation of the return stop first requires the positioning of the respective roller of the respective pair of rollers on the respective clamping ramp. Due to the fact that the respective roller comes to bear against the respective clamping ramp and against the outer ring, the respective roller is ready to block the inner ring when the direction of rotation of the inner ring is reversed. In particular, the return stop has a symmetrical design, so that the above-mentioned function applies to both directions of rotation of the return stop. The return stop thus works bidirectionally.

The return stop is particularly suitable for highly dynamic applications. The design of the respective spring element as a wire bending spring enables a particularly robust and compact implementation of the return stop. The respective spring element may be made of spring steel. The respective spring element may be at least partially rotationally received on the inner ring. Therefore, the receiving of the respective spring element on the inner ring allows a partial rotation of the respective spring element, wherein the partial rotation is limited by a respective stop surface on the inner ring.

The respective spring element may have an annular spring section and two spring arms, wherein the annular spring section joins the two spring arms together in an elastic and flexible way. The respective spring arm may be mounted spatially between the two rollers of the respective pair of rollers. The respective spring arm may have a first section essentially running radially with respect to the annular spring section, a second section connected to the first section and essentially running in the peripheral direction radially between the cage and the inner ring, and a third section connected to the second section and essentially running axially with respect to the inner ring.

Therefore, the respective spring element is designed as a single component and is intended to spring-load two rollers of the respective pair of rollers. The third section of the respective spring arm is intended to radially come to bear against the respective roller of the respective pair of rollers, in order to spring-load the respective roller at least against the outer ring. Furthermore, the first section of the respective spring arm is intended to, as a stop, come to bear in the peripheral direction against the inner ring in order to limit a relative rotational movement of the respective spring element on the inner ring.

The respective spring element may come to bear at least partially against the inner ring on the front side. The at least two spring elements may be mounted next to each other axially, wherein the respective annular spring sections come to bear axially against each other. Consequently, the at least two spring elements are mounted together on one front side of the inner ring.

The at least two spring elements may be mounted axially between the inner ring and a cover disk for at least axially fixing the at least two spring elements on the inner ring. In particular, the inner ring may have an axial recess for receiving the at least two spring elements and the cover disk on the front side, the cover disk being designed essentially correspondingly to the recess in the inner ring and being mounted essentially rotationally fixedly in the recess.

The inner ring may have an axially formed annular projection on a front side for at least partially radially receiving the respective spring element and axially receiving the cover disk. The annular projection therefore extends radially within the respective annular spring section, the axial dimension of the annular projection essentially corresponding to the axial dimension of two annular spring sections mounted axially on one another.

The respective spring element may have a round cross-section. Other geometries are also conceivable for the cross-section of the respective spring element, in particular an elliptical or polygonal cross-section.

BRIEF DESCRIPTION OF THE DRAWINGS

Further measures are described in more detail below together with the description of a preferred embodiment using the figures, wherein identical or similar elements are given the same reference number.

DETAILED DESCRIPTION

Figure 1:
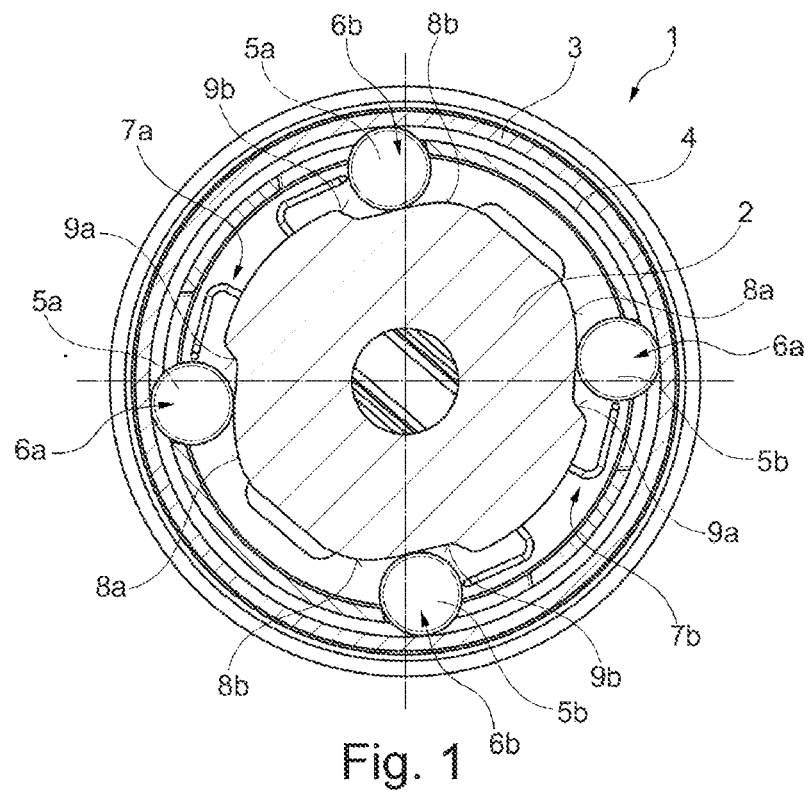
FIG. 1 shows a schematic sectional view of a return stop.
Figure 2:
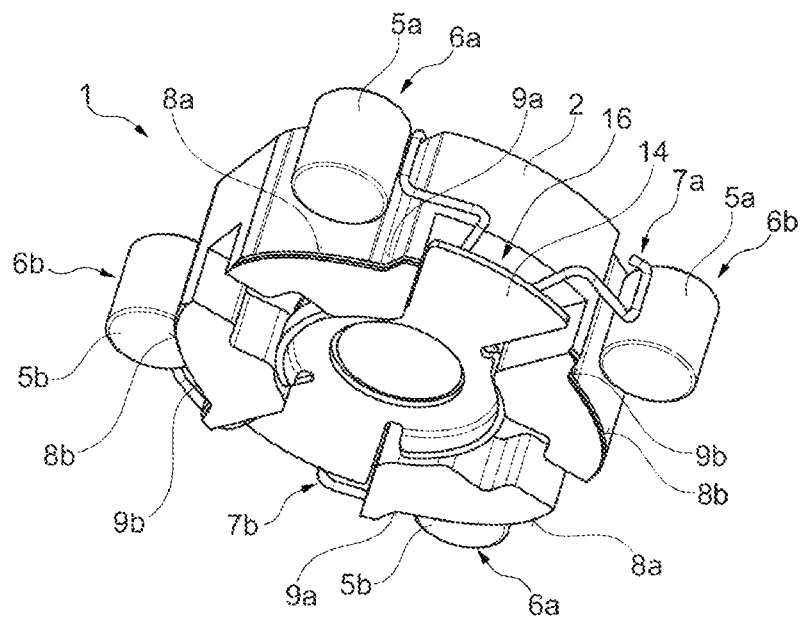
FIG. 2 shows a schematic perspective of the return stop as shown in FIG. 1.

As shown in FIGS. 1 and 2, a return stop 1 comprises a rotational inner ring 2 and a stationary outer ring 3 fixed to a housing not shown here as well as a cage 4 mounted radially between the inner ring 2 and the outer ring 3. Please note that FIG. 2 does not show the outer ring 3 and the cage 4.

The cage 4 has two pairs of rollers 5a, 5b, each consisting of a first and a second roller 6a, 6b. A clamping ramp 8a, 8b is formed on an outer peripheral surface of the inner ring 2 for each roller 6a, 6b of the respective pair of rollers 5a, 5b, wherein both of the respective clamping ramps 8a, 8b of the respective pair of rollers 5a, 5b are formed so as to lead in the peripheral direction in opposite directions away from each other. In other words, the respective first ramp 8a rises radially with a clockwise rotation of the inner ring 2 and the respective second ramp 8b falls radially. A respective radial depression 9a, 9b is formed directly adjacent, and in the peripheral direction in front of the respective radially ascending clamping ramp 8a, 8b, on the inner ring 2.

Furthermore, the return stop 1 has a first and a second spring element 7a, 7b designed as a wire bending spring to spring-load both rollers 6a, 6b of the respective pair of rollers 5a, 5b at least against the outer ring 3. The respective spring element 7a, 7b is received on the inner ring 2. In addition, a cover disk 14 for axially fixing the two spring elements 7a, 7b is mounted on the inner ring 2 on the front side. Therefore, the two spring elements 7a, 7b are mounted axially between the inner ring 2 and the cover disk 14 on the inner ring 2. The cover disk 14 is designed to correspond to a recess 16 on the front side of the inner ring 2 and is thus received essentially rotationally fixedly on the inner ring 2.

Figure 3:
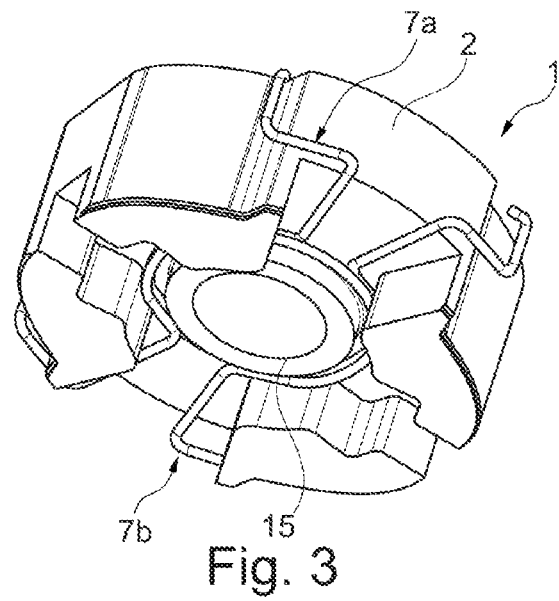
FIG. 3 shows another schematic perspective of the return stop as shown in FIGS. 1 and 2.

FIG. 3 shows the return stop 1 as shown in FIGS. 1 and 2, wherein FIG. 3 does not show the two rollers 6a, 6b of the respective pair of rollers 5a, 5b and the cover disk 14, unlike FIG. 2. As shown in FIG. 3, the inner ring 2 has an axially formed annular projection 15 on a front side for at least partially radially receiving the respective spring element 7a, 7b and axially receiving the cover disk 14. The first spring element 7a comes to bear directly at least partially against the inner ring 2, on the front side, whereas the second spring element 7b comes to bear directly at least partially against the first spring element 7a on the front side, and is thus mounted indirectly on the inner ring 2 via the first spring element 7a. The two spring elements 7a, 7b are therefore mounted axially next to one another.

Figure 4:
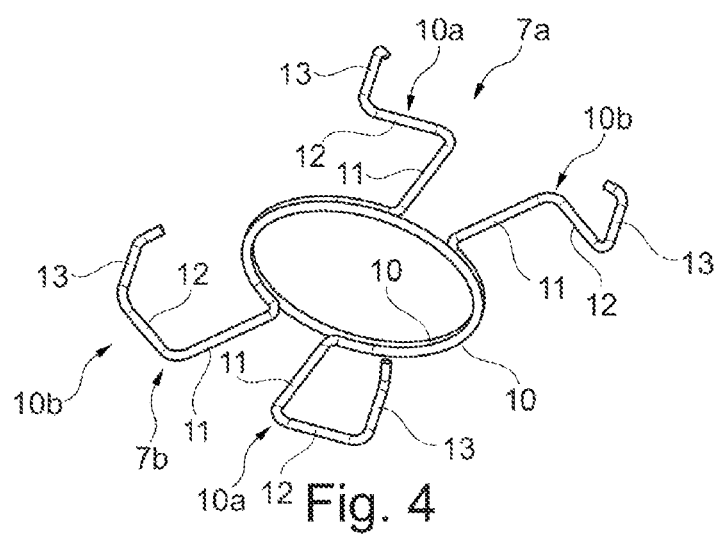
FIG. 4 shows a schematic perspective of two spring elements of the return stop as shown in FIGS. 1 to 3.

FIG. 4, does not show inner ring 2, unlike FIG. 3. Thus, merely the two spring elements 7a, 7b in accordance with FIG. 3 are illustrated.

Figure 5:
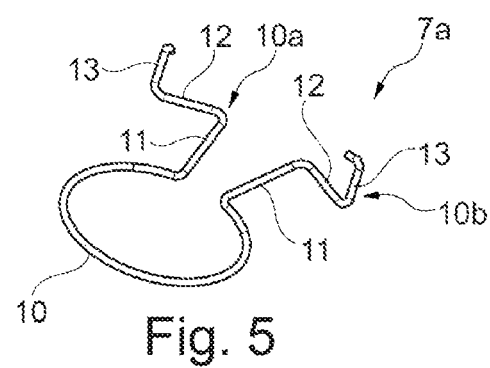
FIG. 5 shows a schematic perspective of one of the two spring elements as shown in FIG. 4.

In FIG. 5, one of the two identically formed spring elements 7a, 7b from FIG. 4 is illustrated, wherein the following description applies for both spring elements 7a, 7b.

The respective spring element 7a, 7b has an annular spring section 10 and two spring arms 10a, 10b, wherein the annular spring section 10 connects the two spring arms 10a, 10b together in an elastic and flexible way. When mounted on the inner ring, the respective annular spring sections 10 of the respective spring element 7a, 7b come to bear axially against each other. The respective spring arm 10a, 10b has a first section 11 essentially running radially with respect to the annular spring section 10, a second section 12 connected to the first section 11 and essentially running in the peripheral direction radially between the cage 4 and the inner ring 2, and a third section 13 connected to the second section 12 and essentially running axially with respect to the inner ring 2. The respective spring element 7a, 7b has a round cross-section.

REFERENCE NUMBER LIST

1 Return stop
2 Inner ring
3 Outer ring
4 Cage
5a, 5b Pair of rollers
6a, 6b Roller
7a, 7b Spring element
8a, 8b Clamping ramp
9a, 9b Radial depression
10 Annular spring section
10a, 10b Spring arm
11 First section
12 Second section
13 Third section
14 Cover disk
15 Annular projection
16 Recess

The invention claimed is:

1. A return stop comprising a rotational inner ring and a stationary, fixed outer ring in addition to a cage which is mounted radially between the inner ring and the outer ring, the cage having at least two pairs of rollers respectively consisting of a first and a second roller, wherein a clamping ramp is formed on an outer peripheral surface of the inner ring for each roller of the respective pair of rollers, wherein a radial depression is formed on the inner ring in a peripheral direction directly adjacent to the respective clamping ramp, wherein both of the respective clamping ramps of the respective pair of rollers are formed so as to lead in the peripheral direction in opposite directions away from each other, and wherein a free-running operation of the return stop, respectively only one roller of the respective pair of rollers comes to bear at a same time against the inner ring and against the outer ring and the respective other roller of the respective pair of rollers, owing to the respective radial depression, does not come to bear at least against the inner ring, wherein a respective spring element designed as a wire bending spring is mounted on the inner ring to spring-load both rollers of the respective pair of rollers at least against the outer ring.

2. The return stop as claimed in claim 1, wherein the respective spring element has an annular spring section and two spring arms, wherein the annular spring section joins the two spring arms together in an elastic and flexible way.

3. The return stop as claimed in claim 2, wherein the respective spring arm is mounted spatially between the two rollers of the respective pair of rollers.

4. The return stop as claimed in claim 2, wherein a respective spring arm has a first section essentially running radially with respect to the annular spring section, a second section connected to the first section and essentially running in the peripheral direction radially between the cage and the inner ring, and a third section connected to the second section and essentially running axially with respect to the inner ring.

5. The return stop as claimed in claim 4, wherein the third section of the respective spring arm bears against the respective roller of the respective pair of rollers, in order to spring-load the respective roller at least against the outer ring (3).

6. The return stop as claimed in claim 4, wherein at least two spring elements are mounted next to each other axially, wherein respective annular spring sections of the two spring elements bear axially against each other.

7. The return stop as claimed in claim 1, wherein the respective spring element comes to bear at least partially and at least indirectly against the inner ring on a front side.

8. The return stop as claimed in claim 1, wherein at least two spring elements are mounted axially between the inner ring and a cover disk for at least axially fixing the at least two spring elements on the inner ring.

9. The return stop as claimed in claim 8, wherein the inner ring has an axially formed annular projection on a front side for at least partially radially receiving the respective spring element and axially receiving the cover disk.

10. The return stop as claimed in claim 1, wherein the respective spring element has a round cross-section.

11. A return stop comprising:
a rotational inner ring wherein two pairs of clamping ramps are formed on an outer peripheral surface of the inner ring, each clamping ramp having two sides with one side being closer to a central axis than the other side, each pair including ramps leading in opposite peripheral directions, wherein radial depressions are formed on the inner ring adjacent to the side of each clamping ramp that is closer to the central axis;
a stationary, fixed outer ring;
a cage mounted radially between the inner ring and the outer ring;
two pairs of rollers, each respectively consisting of a first and a second roller, radially between the inner ring and the outer ring;
two wire bending springs are mounted on the inner ring, each spring loading both rollers of a respective pair of rollers against the outer ring, wherein each wire bending spring has an annular spring section and two spring arms, wherein the annular spring section joins the two spring arms together in an elastic and flexible way.

12. The return stop as claimed in claim 11, wherein the respective spring arms are mounted spatially between the two rollers of the respective pair of rollers.

13. The return stop as claimed in claim 11, wherein each spring arm has a first section essentially running radially with respect to the annular spring section, a second section connected to the first section and essentially running in the peripheral direction radially between the cage and the inner ring, and a third section connected to the second section and essentially running axially with respect to the inner ring.

14. The return stop as claimed in claim 13, wherein each third section of each respective spring arm bears against a roller.

15. The return stop as claimed in claim 13, wherein the two wire bending springs are mounted next to each other axially, wherein the respective annular spring sections come to bear axially against each other.

16. The return stop as claimed in claim 11, wherein the two wire bending springs are mounted axially between the inner ring and a cover disk for at least axially fixing the two wire bending springs on the inner ring.

17. The return stop as claimed in claim 16, wherein the inner ring has an axially formed annular projection on a front side for at least partially radially receiving the respective wire bending springs and axially receiving the cover disk.

18. The return stop as claimed in claim 11, wherein two wire bending springs have a round cross-section.

19. A return stop comprising:
a rotational inner ring wherein two pairs of clamping ramps are formed on an outer peripheral surface of the inner ring, each clamping ramp having two sides with one side closer to a central axis than the other side, each pair including ramps leading in opposite peripheral directions, wherein radial depressions are formed on the inner ring adjacent to the side of each clamping ramp that is closer to the central axis;
a stationary, fixed outer ring;
a cage mounted radially between the inner ring and the outer ring;
two pairs of rollers, each respectively consisting of a first and a second roller, radially between the inner ring and the outer ring;
two wire bending springs are mounted on the inner ring, each spring loading both rollers of a respective pair of rollers against the outer ring, wherein the two wire bending springs are mounted axially between the inner ring and a cover disk for at least axially fixing the two wire bending springs on the inner ring.

20. The return stop as claimed in claim 19, wherein the inner ring has an axially formed annular projection on a front side for at least partially radially receiving the respective wire bending springs and axially receiving the cover disk.

* * * * *